United States Patent
Haase

[11] 3,870,164
[45] Mar. 11, 1975

[54] WORK TRANSFER DEVICE

[76] Inventor: Harold A. Haase, Taunton Hill Rd., Newtown, Conn. 06470

[22] Filed: July 12, 1972

[21] Appl. No.: 271,138

[52] U.S. Cl. ............ 214/1 BB, 82/34 D, 214/1 BC, 408/14
[51] Int. Cl. .............................................. B66c 1/10
[58] Field of Search ..... 214/1 B, 1 BB, 1 BC, 1 BD, 214/147 T, 1 BS, 1 BT, 1 BH, 1 BV, 147 G, 1 GV; 82/34 D; 408/14

[56] References Cited
UNITED STATES PATENTS

| | | | |
|---|---|---|---|
| 2,392,571 | 1/1946 | Berger | 214/1 BB |
| 3,212,649 | 10/1965 | Johnson | 214/1 BC |
| 3,575,301 | 4/1971 | Panissidi | 214/147 T |
| 3,698,052 | 10/1972 | Ellis | 408/14 X |
| 3,709,379 | 1/1973 | Kaufeldt | 214/1 CM |
| 3,711,212 | 1/1973 | Kuck | 408/14 X |

*Primary Examiner*—Robert J. Spar
*Assistant Examiner*—George F. Abraham
*Attorney, Agent, or Firm*—Smythe & Moore

[57] ABSTRACT

A transfer means including a work gripping arm for moving the work to selected positions, the transfer means having stop or positioning shock absorbers. There can be shock absorbers for either direction of movement, and there can be a plurality of settable stops and adjustable positioners so that various selected positions can be achieved.

8 Claims, 7 Drawing Figures

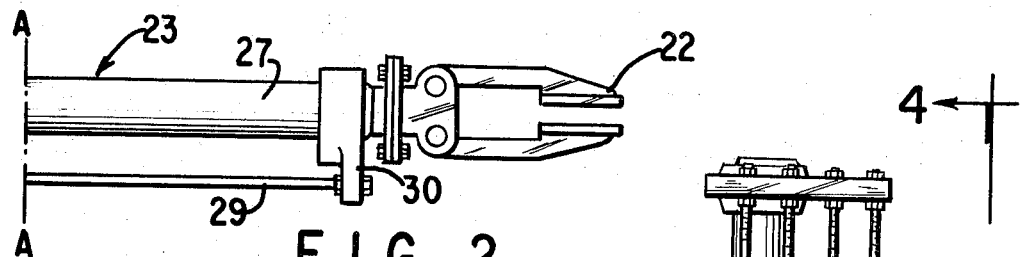
FIG. 2
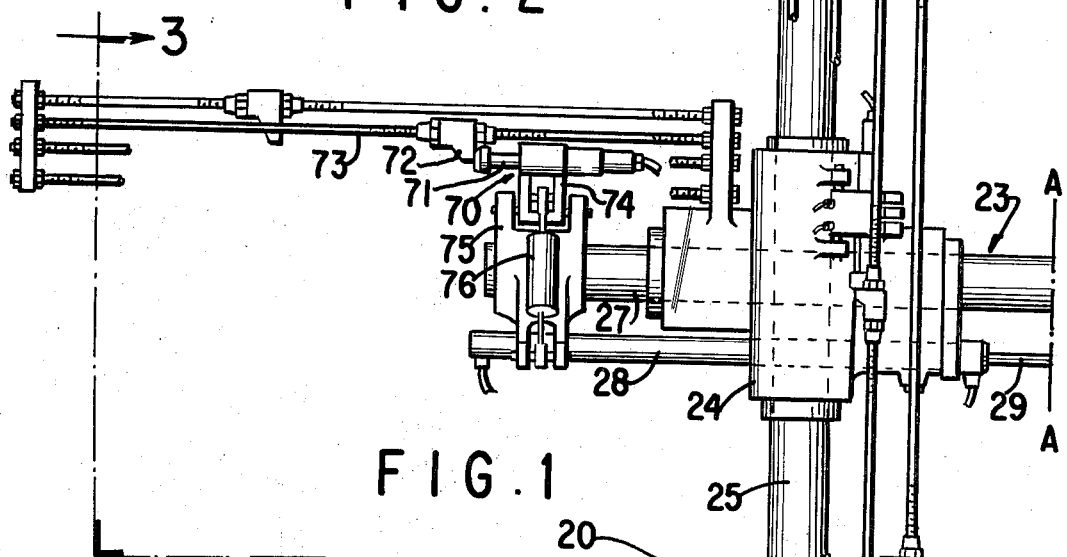
FIG. 1
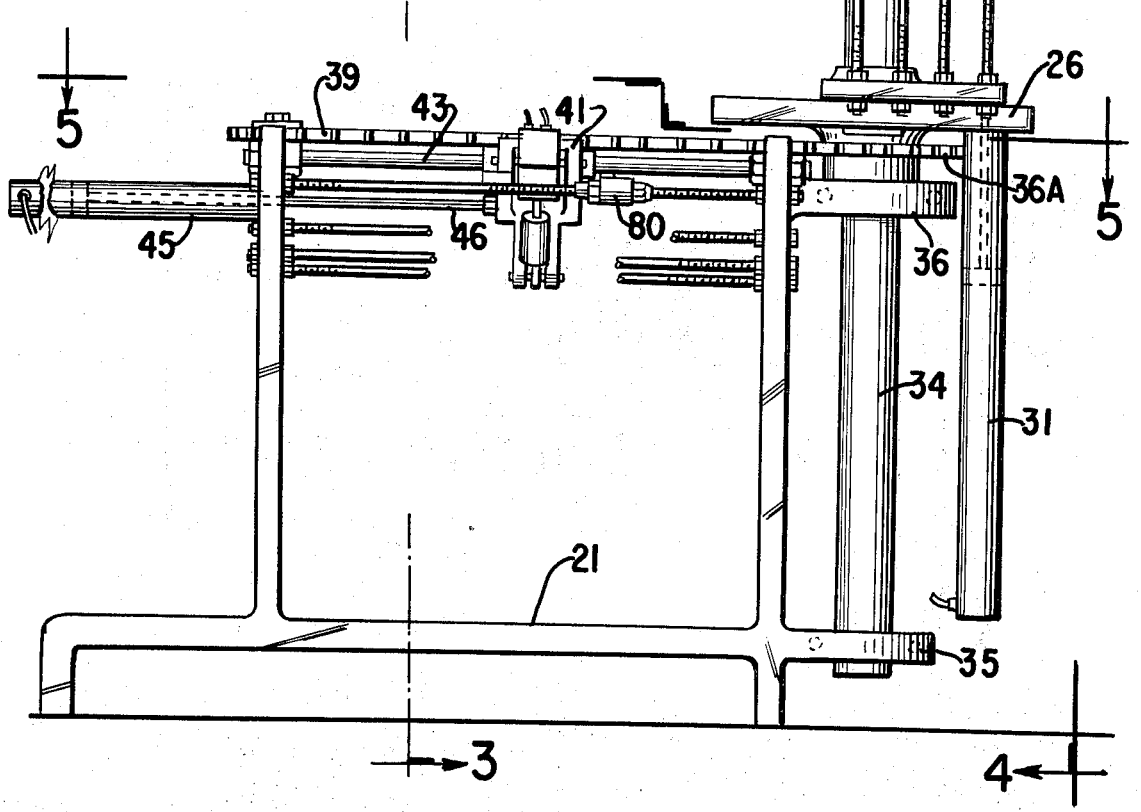

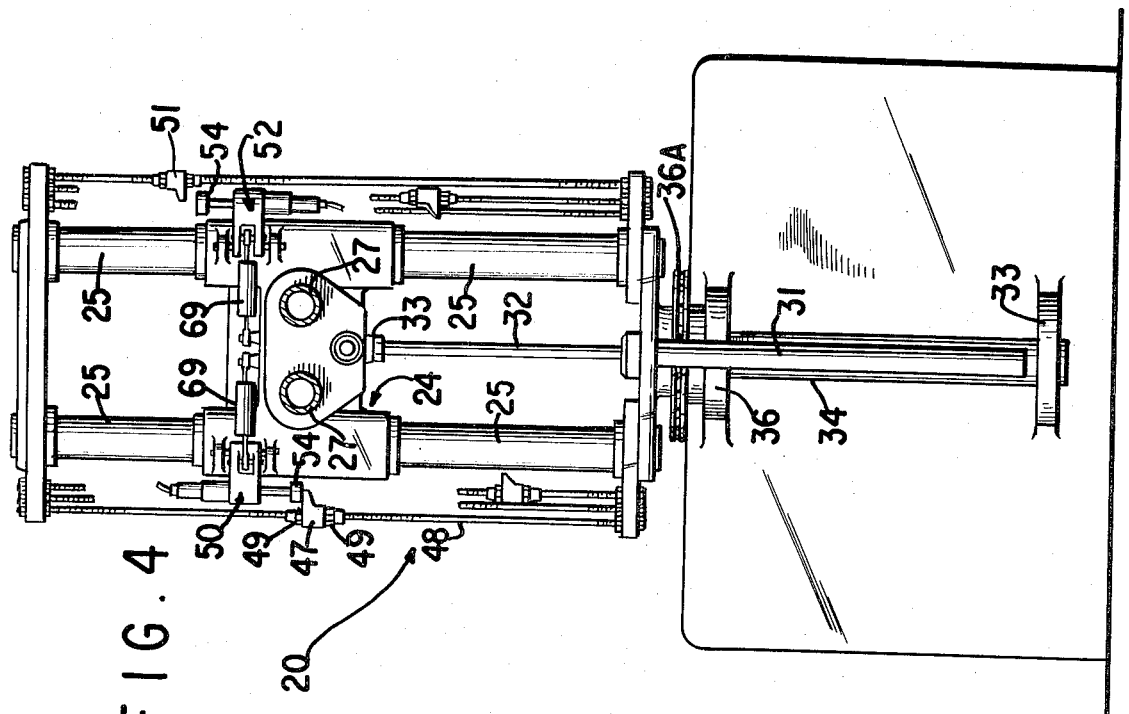
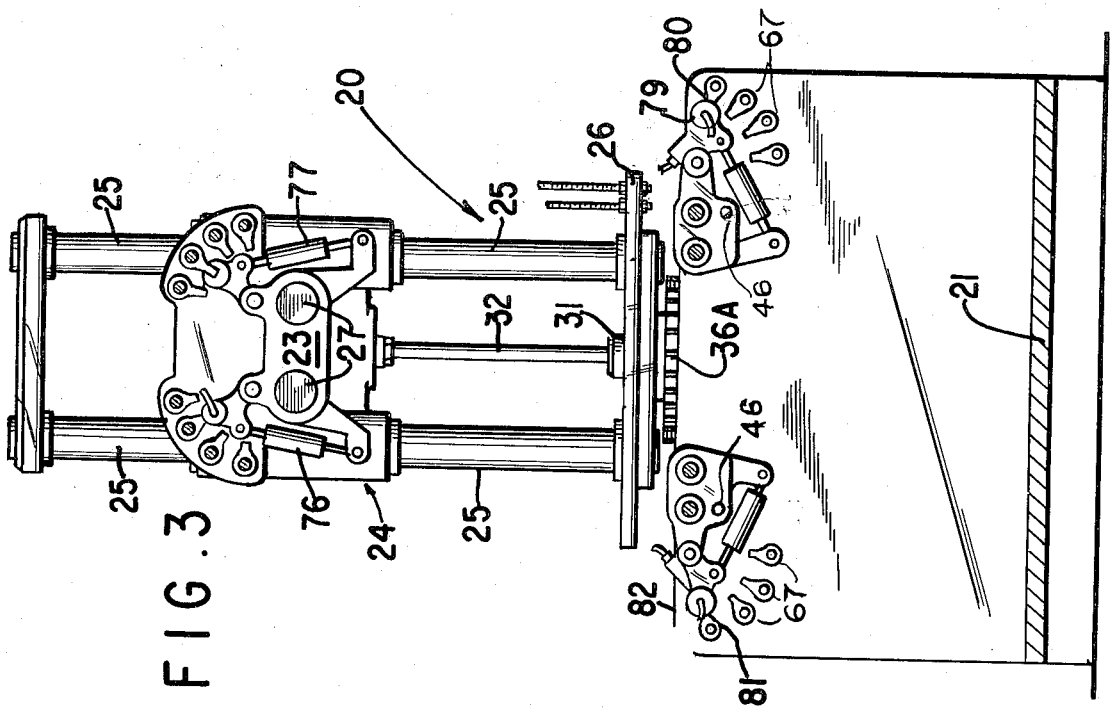

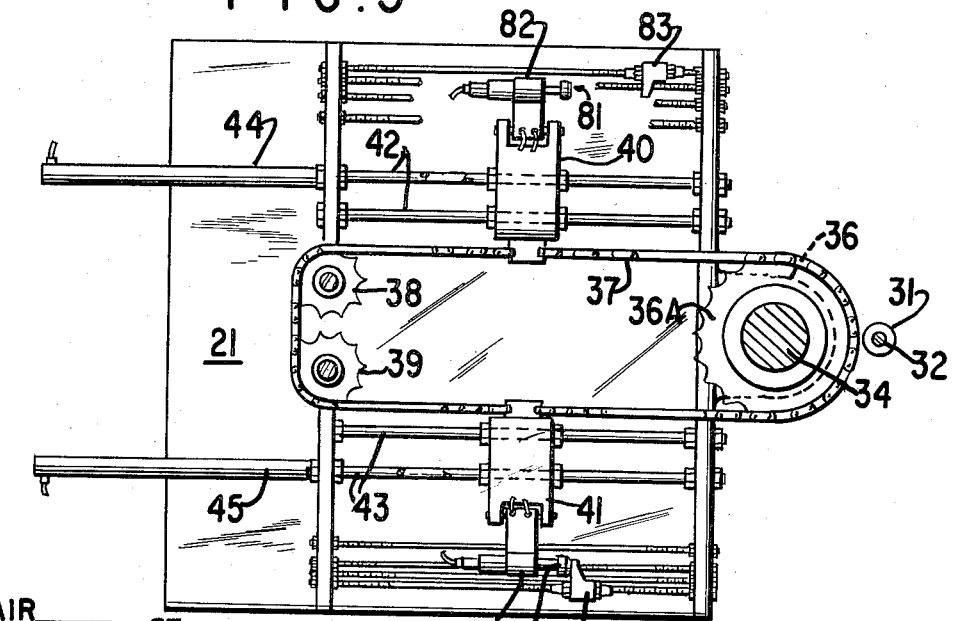

WORK TRANSFER DEVICE

This invention relates to work transfer means and particularly to a stop and positioning mechanism.

In transfer apparatus for moving work pieces to various selected positions, prior devices have been complicated and expensive to build. The prior art devices also have been difficult to maintain because of the sophisticated movement and required feedback circuitry. The stop position must be accurately reached.

One of the objects of the invention is to provide an improved and economical transfer arm positioner.

Another of the objects of the invention is to provide a positioner arrangement which can be operated at increased speed.

Another of the objects of the invention is to provide a positioner device which accurately locates the work each movement.

In one aspect of the invention, the frame means carries a carriage upon which an arm means is movably mounted, the arm means being movable relative thereto by a suitable motor, such as a fluid-operated device. An adjustable stop means is provided together with positioning means between said arm means and stop means for stopping the arm means when it reaches a preselected position. The positioning means can include fluid cushioning means serving as a shock absorber for bringing the carriage or arm to a stopped selected position. A plurality of positioning means can be rotatably or movably mounted on its carriage or arm so that adjustable stops located at different positions can be selected. Means can be provided to rotate the carriage means of the supports therefore so that the transfer means or work holder can be moved to a selected position in an X-Y-Z axis configuration. The various controls can be fed to a conventional programming computer control for operating the device.

These and other objects, advantages and features of the present invention will become apparent from the following description and drawings, which are merely exemplary.

In the drawings:

FIG. 1 is a vertical side view with parts broken away for clarity;

FIG. 2 is a side view of the work gripper wherein line A—A of FIG. 1 coincides with line A—A of FIG. 2;

FIG. 3 is a reduced size elevation looking in the direction of line 3—3 of FIG. 1;

FIG. 4 is a reduced size elevation looking in the direction of line 4—4 of FIG. 1;

FIG. 5 is a reduced size view taken along the line 5—5 of FIG. 1;

FIG. 6 is an enlarged fragmentary view of one of the stop changing devices; and

FIG. 7 is an enlarged fragmentary view of a stop and inertia absorber or positioner and shows a control for the positioner.

Where appropriate, the same reference numerals will be used in the various drawings to indicate the same parts.

The transfer apparatus indicated generally by 20 is carried on frame 21, the material or workpiece transfer device or reaching arm 22 being supported on horizontal support or arm means 23.

The horizontal support means for the transfer work holder has carriage means 24 which is vertically movable on columns 25, 25 mounted on rotatable table 26. The vertically movable horizontal support means 23 includes two rods 27, 27 (FIGS. 1, 4) upon which the transfer head 30 is mounted. Work transfer means 22 is moved in and out or horizontally relative to the carriage means 24 by means of a fluid-operated motor composed of cylinder 28 and piston rod 29 which is fastened at one end to transfer head 30 of the transfer mechanism. The vertically movable carriage means 24 can be moved up and down by fluid-operated motor 31 and asssociated piston rod 32, said rod having one end 33 connected to the vertically movable support or carriage 24. When the term "fluid" is used, the term includes hydraulic and gas actuation.

In the form shown, if it is desired to rotate the work transfer means 22 in a plane parallel to the frame 21, table 26 is rotatable by means of shaft 34 which is rotatably mounted in bearings 35 and 36. Sprocket or gear 36A (FIGS. 1, 5) is rotated by a chain or connecting means 37 which travels over idler sprockets 38, 39 (FIG. 5). The chain is connected to horizontally slidable positioner supports 40, 41 which are slidable on rods 42 and 43, respectively. Fluid-operated motors having cylinders 44, 45 actuate piston rods 46, 46. Thus, rotation of table 26 will cause rotation of carriage 24 and related parts.

In order selectively to control the movement of the work transfer means 22, the various fluid actuators can be connected to a console (not shown) which has the proper valving and automatic programming control means as is known in the art for actuating the various parts in a predetermined manner.

Operation of one of the controls will now be described. Referring to the left-hand stop 47 (FIG. 4), the stop is adjustably mounted on screw-threaded rod 48 and is held in place by nuts 49. The stop 47 cooperates with the shock absorber or positioning means 50 mounted on the vertically movable carriage or support 24, arresting movement of carriage 24 in a downward direction. On the opposite side, adjustable stop or abutment 51 cooperates with the shock absorber positioner 52 but faces in the opposite direction to that of the left-hand stop.

Referring now to FIGS. 6 and 7, one of the stop and shock absorber or positioner arrangements will be described. Shock absorber or positioning means 50 has a cylinder 53 mounted thereon, the cylinder 53 and piston 54 being aligned with stop 49 in a manner to be described hereafter. Shock absorber cylinder 53 is connected to a fluid pressure supply means 55 which supplies fluid, such as oil, through pipe 56, line 58, to both sides of cylinder 53. The difference in piston areas will cause piston 54 to be urged to the right (FIG. 7). Valve 57 is controlled by the aforementioned automatic console so as to open or close in accordance with commands therefrom.

When carriage 24 moves down (FIG. 4), stop 49 will come into contact with piston or head 54 of the positioner, and as movement continues, the shock absorber will function so as to cushion the stop by controlling the fluid flow through orifice 59.

Various manners of control can be employed to give a signal to the console that the stop or selected position has been reached. As a specific example, when piston 54 (FIG. 7) has been moved to the left, it will close off bleed aperture or passage 61, passage 61 being connected to control means 62. A low pressure air supply 63 can furnish air to compartment 64 which has a diaphragm 65 as one wall thereof. Normally, when passage 61 is open, air will bleed or leak off therethrough. When passage 61 is closed by head 54, air pressure will increase in compartment 64 so as to cause diaphragm 65 to actuate switch 66 and furnish a signal to the console. Other types of control and indicating can be used.

A similar arrangement to that just described is shown for stop 51 (FIG. 4) and shock absorber or positioner 52 for controlling movement in the opposite direction.

It has been found that when the carriage is stopped in one direction and the control stops are to be moved, it may be desirable to relieve pressure on piston head 54 relative to its respective stop. Thus, stop 51 can be so positioned relative to stop 49 that it will permit a reverse limited movement.

After the carriage has been so positioned, it is desirable to be able to move it to another preselected position. A plurality of stop rods 67 (FIGS. 3, 6) can be arcuately located around center 68 (FIG. 6). Fluid-operated motor 69 will swing the shock absorber cylinder and assembly 53 to a selected one of the stop rods having a stop at a different position. Thus, after once positioning the vertical carriage, it will be possible to move the carriage 24 to other selected positions by actuation of fluid motor 31.

The horizontal support means 23 is movable from right to left or vice versa relative to carriage 24 and is controlled by a similar stop arrangement. For example, shock absorber or positioner 70 (FIG. 1) has a piston 71, similar to 54, positionable by adjustable stop 72 (similar to 47) on threaded rod 73 (similar to 48). Shock absorber or positioner 74 is pivotably mounted on support 75 and actuates in the same manner as that described in conjunction with FIGS. 6 and 7. Fluid motor 76 (FIGS. 2, 3) and 77 act similarly to that described for fluid motor 69.

A similar stop arrangement is provided for rotation of sprocket 36A so that the transfer mechanism is movable in a plane parallel to the frame 21. In this case, however, the chain 37 is continuous so as to inhibit backlash or lost motion. Piston head 78 and shock absorber 79 cooperate with stop 80 (FIG. 5). On the other side of the device, piston head 81 and shock absorber 82 cooperate with adjustable stop 83.

Thus, it can be seen that the work can be moved to a preselected X-Y-Z axis position.

It will be understood that various details of construction and arrangement of parts may be changed without departing from the spirit of the invention.

What is claimed is:

1. In a transfer means for moving a reaching arm to a preselected position, the combination including frame means, carriage means carrying said reaching arm, said carriage means being vertically movable relative to said frame means, arm means having said reaching arm thereon, said arm means being horizontally movably mounted on said carriage means and movable relative thereto, positioning means including shock absorbing means mounted on said arm means and movable therewith, a plurality of stop means on said carriage means, said positioning means and stop means being movable relative to each other as said arm means moves, said positioning means contacting the one of said plurality of stop means which is in the line of movement of said positioning means and shock absorbing means for stopping said arm means at a preselected position, and means for transversely moving said positioning means and shock absorbing means relative to said stop means so as to preselect the one of said stop means to be contacted by the positioning and shock absorbing means.

2. A transfer means as claimed in claim 1 wherein said positioning means and shock absorbing means are mounted on an arm arcuately movable relative to said plurality of stop means.

3. A transfer means as claimed in claim 1 wherein said positioning means and shock absorbing means comprises an integral shock absorbing means and including an arm positioning plunger which is contactable with said stop means as said arm means is moved relative to said carriage means, said plunger being fluid activated to provide shock absorbing force and stopping movement of said arm means relative to said carriage means after said plunger contacts said stop means, and fluid operated signal means operated by said plunger means when the plunger means reaches the end of its travel and stops movement of said arm means relative to said carriage means.

4. A transfer means as claimed in claim 1 including means for rotating said carriage means in a plane substantially parallel to said arm means.

5. A transfer means as claimed in claim 1 and having a second set of a plurality of adjustable stop means on said carriage means and positioning means including shock absorbing means mounted on said arm means for stopping movement of said arm means relative to said carriage means when moved in the opposite direction.

6. A transfer means as claimed in claim 1 and also including a plurality of adjustable vertical stop means mounted on a vertical axis relative to said arm means and vertical positioning means including shock absorbing means mounted on said carriage means and movable vertically therewith for contacting one of said plurality of vertical stop means which is in the line of movement of said vertical positioning means for stopping vertical movement of said carriage means, and means for transversely moving said vertical positioning means and shock absorbing means relative to said vertical stop means so as to preselect the one of said vertical stop means to be contacted by the vertical positioning and shock absorbing means.

7. In a transfer means as claimed in claim 4 wherein said means for rotating said carriage means includes an endless drive chain means and a pair of positioning means connected thereto, one of said positioning means cooperating with a stop means for stopping movement of said chain means in one direction and the other of said positioning means cooperating with a stop means for stopping said chain means in the other direction.

8. In a transfer means for moving a reaching arm to a preselected position, the combination including frame means, carriage means carrying said reaching arm, said carriage means being vertically movable relative to said frame means, arm means having said reaching arm thereon, said arm means being horizontally movably mounted on said carriage means and movable relative thereto, adjustable stop means mounted on said carriage means, positioning means mounted on said arm means, said positioning means comprising an integral shock absorbing means and including an arm positioning plunger which is contactable with said stop means as said arm means moves relative to said carriage means, said plunger being fluid activated to provide shock absorbing force and stopping movement of said arm means relative to said carriage means after said plunger contacts said stop means, and fluid operated signal means operated by said plunger means when the plunger means reaches the end of its travel and stops movement of said arm means relative to said carriage means.

* * * * *